(12) United States Patent
Binek et al.

(10) Patent No.: US 11,136,901 B2
(45) Date of Patent: Oct. 5, 2021

(54) MONOLITHIC COMBUSTOR FOR ATTRITIABLE ENGINE APPLICATIONS

(71) Applicant: UNITED TECHNOLOGIES CORPORATION, Farmington, CT (US)

(72) Inventors: Lawrence A. Binek, Glastonbury, CT (US); Jesse R. Boyer, Middletown, CT (US); Evan J. Butcher, Suffield, CT (US); Dmytro Mykolayovych Voytovych, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 136 days.

(21) Appl. No.: 16/415,327

(22) Filed: May 17, 2019

(65) Prior Publication Data
US 2020/0362724 A1 Nov. 19, 2020

(51) Int. Cl.
*F01D 25/00* (2006.01)

(52) U.S. Cl.
CPC ........ *F01D 25/005* (2013.01); *F05D 2230/50* (2013.01); *F05D 2230/60* (2013.01); *F05D 2240/35* (2013.01); *F23R 2900/00018* (2013.01)

(58) Field of Classification Search
CPC ............. F05D 2230/50; F05D 2230/60; F05D 2240/35; F23R 2900/00018; F23R 3/00; F23R 3/002; F23R 3/46; F23R 3/50
See application file for complete search history.

(56) References Cited

U.S. PATENT DOCUMENTS

| | | | |
|---|---|---|---|
| 3,844,116 A | 10/1974 | Matto | |
| 4,259,839 A * | 4/1981 | Bayle Laboure | F23R 3/18 60/765 |
| 5,131,223 A * | 7/1992 | Owen | F02C 7/26 60/263 |
| 5,317,864 A | 6/1994 | Horb et al. | |
| 5,727,378 A * | 3/1998 | Seymour | F02C 3/09 60/804 |
| 5,927,066 A * | 7/1999 | Shekleton | F23R 3/04 60/804 |
| 6,374,592 B1 * | 4/2002 | Box | F02C 7/264 60/39.464 |

(Continued)

FOREIGN PATENT DOCUMENTS

| | | | |
|---|---|---|---|
| WO | 2018190926 | 10/2018 | |
| WO | WO-2018190926 A1 * | 10/2018 | F23R 3/343 |

OTHER PUBLICATIONS

European Patent Office, European Search Report dated Sep. 17, 2020 in Application No. 20174955.3.

*Primary Examiner* — Craig Kim
(74) *Attorney, Agent, or Firm* — Snell & Wilmer L.L.P.

(57) ABSTRACT

A monolithic combustor apparatus comprises an outer casing comprising a forward flange, a fuel manifold disposed on the outer casing and defining an annular chamber extending perimetrically around the outer casing, a combustor liner disposed within the outer casing, the combustor liner defining an annular combustion chamber, a first annular plenum disposed between the outer casing and the combustor liner, an inner liner disposed radially from the combustor liner, a first inner flange extending forward from the combustor liner, and a second inner flange extending radially inward from the first inner flange.

20 Claims, 6 Drawing Sheets

(56) References Cited

U.S. PATENT DOCUMENTS

| | | | |
|---|---|---|---|
| 6,941,760 B1 * | 9/2005 | Jones | F02C 7/268 |
| | | | 60/727 |
| 9,803,498 B2 | 10/2017 | Jewess et al. | |
| 2016/0252252 A1 * | 9/2016 | Dai | F23D 17/002 |
| | | | 60/740 |
| 2017/0009989 A1 | 1/2017 | Clemen | |
| 2018/0355760 A1 | 12/2018 | Kerns et al. | |
| 2018/0363555 A1 | 12/2018 | Zelina et al. | |
| 2019/0086081 A1 | 3/2019 | Bellardi | |

* cited by examiner

MONOLITHIC COMBUSTOR FOR ATTRITIABLE ENGINE APPLICATIONS

FIELD

The present disclosure relates to gas turbine engines, and, more particularly, to a combustor arrangement for a miniature gas turbine engine.

BACKGROUND

Miniature gas turbine or turbojet engines (typically of 150 foot pounds (lbf) thrust and smaller) are often utilized in single usage applications such as drones and other small aircraft applications. The use of such an engine greatly extends the range of the aircraft in comparison to a solid fuel engine.

To achieve economically feasible extended range expendable propulsion sources for such applications, miniature gas turbine engines should be able to be manufactured relatively inexpensively yet provide a high degree of starting and operational reliability.

SUMMARY

A monolithic apparatus is disclosed, comprising an outer casing comprising a forward flange, a fuel manifold disposed on the outer casing and defining an annular chamber extending perimetrically around the outer casing, a combustor liner disposed within the outer casing, the combustor liner defining an annular combustion chamber, a first annular plenum disposed between the outer casing and the combustor liner, an inner liner disposed radially from the combustor liner, a first inner flange extending forward from the combustor liner, and a second inner flange extending radially inward from the first inner flange.

In various embodiments, the monolithic apparatus further comprises an injector port extending into the combustion chamber from the combustor liner.

In various embodiments, the injector port defines a diamond-shaped aperture.

In various embodiments, the monolithic apparatus further comprises a gusset extending from a forward edge of the injector port.

In various embodiments, an aft wall of the outer casing extends towards the inner liner at an angle with respect to a centerline axis, wherein the angle is between thirty and eighty degrees.

In various embodiments, an aft, radially inner corner of the combustor liner comprises a chamfer.

In various embodiments, the monolithic apparatus further comprises a diffuser disposed at an inlet of the first annular plenum.

In various embodiments, the monolithic apparatus further comprises a turbine nozzle disposed at an exit of the combustion chamber.

In various embodiments, the monolithic apparatus further comprises a second annular plenum disposed between the inner liner and the combustion chamber.

A turbine engine arrangement is disclosed, comprising a forward housing, a rotor shaft rotatably mounted to the forward housing, a compressor wheel operatively coupled to the rotor shaft, a turbine wheel operatively coupled to the rotor shaft, and a monolithic combustor. The monolithic combustor comprises an outer casing comprising a forward flange, wherein the forward housing is coupled to the monolithic combustor at the forward flange, a fuel manifold disposed on the outer casing and defining an annular chamber extending perimetrically around the outer casing, a combustor liner disposed within the outer casing, the combustor liner defining an annular combustion chamber, a first annular plenum disposed between the outer casing and the combustor liner, an inner liner disposed radially from the combustor liner, a first inner flange extending forward from the combustor liner, and a second inner flange extending radially inward from the first inner flange.

In various embodiments, the turbine engine arrangement further comprises an injector port extending into the combustion chamber from the combustor liner.

In various embodiments, the turbine engine arrangement further comprises a diffuser disposed at an inlet of the first annular plenum, wherein the diffuser receives a flow of air from the compressor wheel.

In various embodiments, the turbine engine arrangement further comprises a turbine nozzle disposed at an exit of the combustion chamber, wherein the turbine nozzle directs a flow of combustion gas towards the turbine wheel.

In various embodiments, a geometry of the first inner flange is complementary to that of the compressor wheel.

In various embodiments, a geometry of the second inner flange is complementary to that of the turbine wheel.

In various embodiments, the turbine engine arrangement further comprises a second annular plenum disposed between the inner liner and the combustion chamber.

In various embodiments, the turbine wheel extends at least partially into the inner liner.

In various embodiments, the monolithic combustor is configured to direct a flow of air in a first longitudinal direction through the first annular plenum, in a second longitudinal direction through the combustion chamber, and in the first longitudinal direction through the inner liner.

A method is disclosed, comprising defining a monolithic apparatus design having an outer casing comprising a forward flange, a fuel manifold disposed on the outer casing and defining an annular chamber extending perimetrically around the outer casing, a combustor liner disposed within the outer casing, the combustor liner defining an annular combustion chamber, a first annular plenum disposed between the outer casing and the combustor liner, an inner liner disposed radially from the combustor liner, a first inner flange extending forward from the combustor liner, and a second inner flange extending radially inward from the first inner flange, and manufacturing a monolithic apparatus based on the monolithic apparatus design using an additive manufacturing process.

In various embodiments, the monolithic apparatus design further comprises a diffuser disposed at an inlet of the first annular plenum and a turbine nozzle disposed at an exit of the combustion chamber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

A one-piece, monolithic combustor of the present disclosure may be built as a single part in the longitudinal direction using additive manufacturing methods without a support structure. A geometry of the monolithic combustor of the present disclosure may be configured for efficient additive manufacturing, in accordance with various embodiments. A monolithic combustor of the present disclosure may result in reduced overall part count of a gas turbine engine, reduced overall weight of the gas turbine engine, reduced manufacturing time of the gas turbine engine, and/or reduced manufacturing time of the combustor itself.

Figure 1:
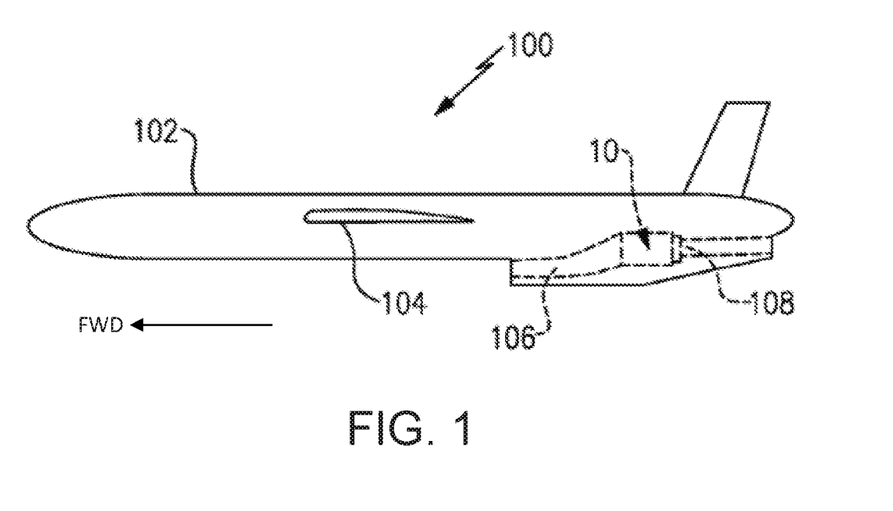
- FIG. 1 illustrates a schematic view of a vehicle with a miniature gas turbine engine, in accordance with various embodiments.

FIG. 1 illustrates a general schematic view of a vehicle 100 including a miniature gas turbine engine 10 according to the present disclosure. The vehicle 100 includes a body 102 and one or more aerodynamic surfaces 104. The engine 10 is coupled to, or within, the body 102. A vehicle inlet duct 106 provides air to the engine 10, and an exhaust duct 108 exhausts the thrust therefrom. The various components are shown in a particular configuration for clarity, however other configurations are possible in other embodiments such as, for example, in other single usage and reusable applications such as drones and other small aircraft applications.

Figure 2:
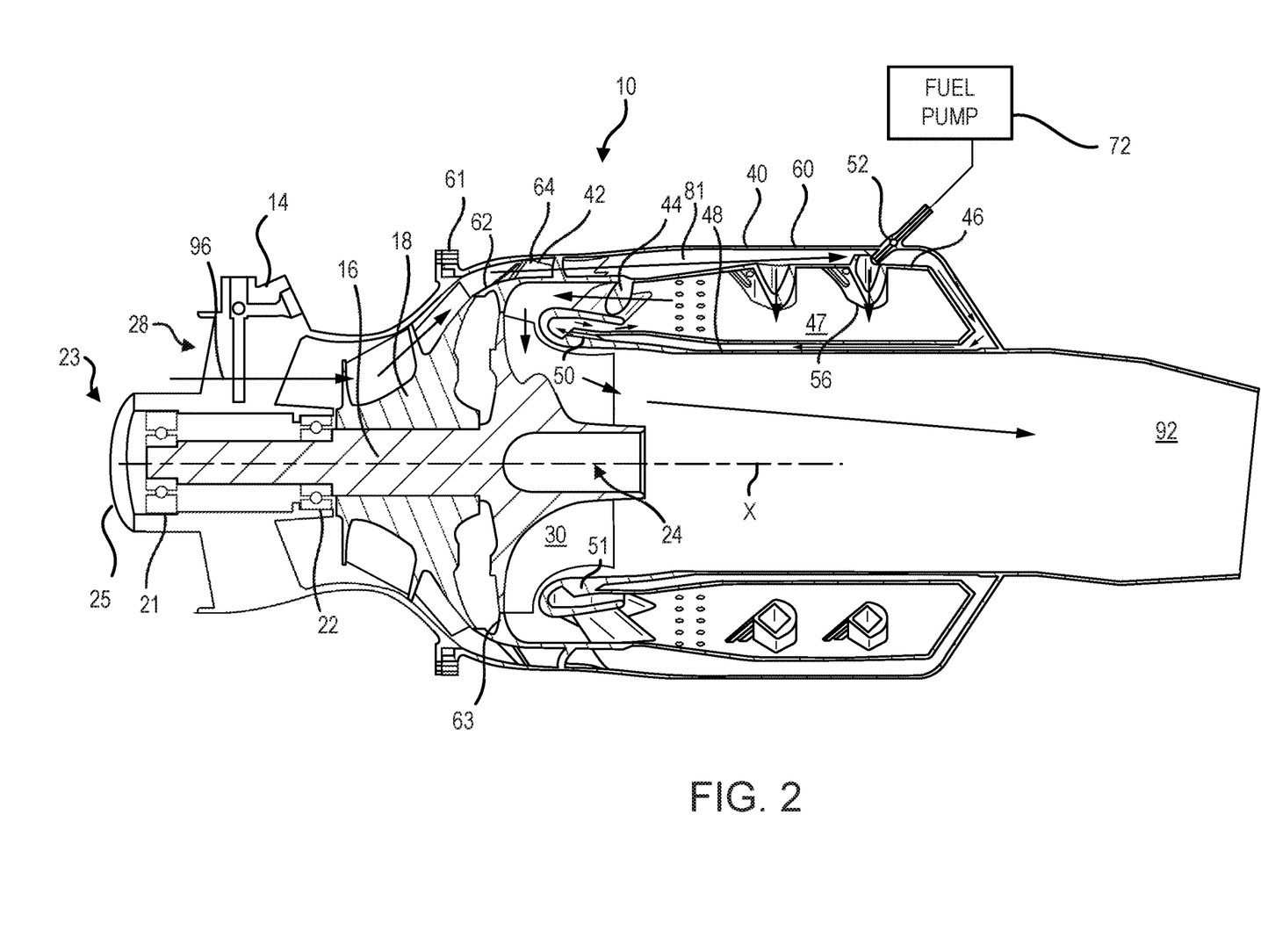
FIG. 2 illustrates a cross-sectional view of a miniature gas turbine engine, in accordance with various embodiments.

With reference to FIG. 2, the miniature gas turbine engine 10 generally includes a forward housing 14, a rotor shaft 16 rotationally mounted to forward housing 14, a compressor wheel 18, and a one-piece combustor 40. Rotor shaft 16 may be rotationally mounted to forward housing 14 via a forward bearing 21 and an aft bearing 22. The rotor shaft 16 rotates about a longitudinal axis X.

In the illustrated rotor configuration, a rotor system 24 includes a multiple of compressor blades facing forward toward an intake 28 to define compressor wheel 18 and a multiple of turbine blades facing rearward toward the exhaust duct 92 to define a turbine wheel 30. The rotor shaft 16 is received in the bearings 21 and 22. In various embodiments, the forward cover 25 of the inlet cone 23 is the forward most portion of the engine 10 and defines an aerodynamically contoured shape which facilitates the delivery of undistorted, primary airflow to the intake 28.

In various embodiments, combustor 40 includes a forward flange 61 whereby combustor 40 is coupled to forward housing 14. In various embodiments, forward flange 61 may have a plurality of circumferentially disposed apertures extending longitudinally through forward flange 61 whereby forward flange 61 is fastened to forward housing 14. In various embodiments, forward flange 61 is fastened to forward housing 14 via a plurality of threaded fasteners.

In various embodiments, other components, such as a permanent magnet generator (PMG) for example, are mounted to the rotor shaft 16 behind the forward bearing 21 to generate electrical power for the engine 10 and other accessories. For example, a PMG may include a stator mounted within a forward housing inner support of the forward housing 14 and a rotor mounted to the rotor shaft 16. One or mores electrical power wires may communicate electrical power from the PMG to an electrical power system.

In various embodiments, a fuel pump (illustrated schematically at 72) may be driven by an electrical power system to communicate fuel from a source to an annular combustor liner 46 through a fuel manifold 52. Combustor liner 46 may define an annular combustion chamber 47. One or more ignitor holding features 49 (see FIG. 3B) may be disposed at an aft end of the combustor liner 46 for attaching one or more ignitors, such as a torch, to combustor 40 whereby the fuel-air mixture is ignited. The fuel is burned at high temperatures within the combustor liner 46 such that the expanding exhaust gases therefrom are communicated to the turbine wheel 30. The combustor liner 46 is in fluid communication with the exhaust duct 92 such that exhaust gases from the combustor liner 46 are directed through a turbine nozzle 44, through to the turbine wheel 30, through the exhaust duct 92 and exiting the exhaust duct 108 (see FIG. 1) of the vehicle for generating thrust.

In various embodiments, combustor 40 generally comprises an outer casing 60, the combustor liner 46, a diffuser 42, a turbine nozzle 44, and an inner liner 48. In various embodiments, the combustor liner 46 is disposed within outer casing 60 and forms an annular plenum 81 therebetween. The diffuser 42 may be disposed at an inlet of plenum 81. An inner flange 62 (also referred to herein as a first inner flange) may extend forward from combustor liner 46. Air may enter combustor 40 from compressor wheel 18 at inner flange 62. In this regard, the geometry of inner flange 62 may be complementary to that of compressor wheel 18. In various embodiments, the inner flange 62 interfaces with the compressor wheel 18. The diffuser 42 may comprise a plurality of vanes 64 disposed circumferentially around the inlet of plenum 81 and extending between outer casing 60 and inner flange 62. The plurality of vanes 64 may be configured to turn the air flowing entering plenum 81 to flow substantially parallel with the centerline axis X during operation. The turbine nozzle 44 may be disposed at a forward end of the combustion chamber whereby exhaust gasses exit the combustion chamber 47 and expand across the turbine wheel 30, thereby converting the thermal energy of the exhaust gasses into rotational movement energy of rotor shaft 16. In various embodiments, the turbine nozzle 44 is coupled to the inner liner via a forward, annular nose lip 65. The forward, annular nose lip 65 may comprise a "C"-shaped cross-section geometry. The forward, annular nose lip 65 may comprise a rounded, smooth, forward edge surface whereby the combustion gas is turned into the inner liner from the turbine nozzle.

In various embodiments, an inner flange 63 (also referred to herein as a second inner flange) may extend radially inward from inner flange 62. Inner flange 63 may direct the exhaust gases exiting turbine nozzle 44 towards turbine wheel 30. In this regard, the geometry of inner flange 63 may be complementary to that of turbine wheel 30. In various embodiments, inner flange 63 interfaces with turbine wheel 30. The turbine wheel 30 may extend at least partially into the inner liner 48.

In various embodiments, one or more fuel injectors 53 extend radially inward from fuel manifold 52 whereby fuel is injected into combustor 40. A fuel line attachment member 54 may extend from fuel manifold 52 whereby fuel manifold 52 is supplied with the fuel from a fuel source. Fuel manifold 52 may define an annular chamber extending around the perimeter of outer casing 60 whereby fuel may be routed through outer casing at one or more location disposed circumferentially around outer casing 60. In this manner, the fuel manifold 52 may be integrated into the outer casing 60. The atomized fuel may mix with air located within combustor 40 upon entry thereof. A plurality of injector ports 56 may extend radially inward from combustor liner 46 whereby the fuel-air mixture enters the combustion chamber 47. The fuel-air mixture may ignite in the combustion chamber 47, generating exhaust gases which expand through turbine nozzle 44, across the turbine wheel 30, and into inner liner 48. In various embodiments, inner liner 48 defines an exhaust duct through which exhaust gases exit combustor 40. The turbine nozzle 44 comprises a plurality of vanes extending between forward flange 62 and inner liner 48 and at least partially defining a flow path from combustion chamber 47 to inner liner 48.

In various embodiments, during operation, combustor 40 receives compressed air, illustrated by arrows 96, from the compressor wheel 18 at the diffuser 42. The air entering diffuser 42 flows in a circumferential direction and is turned by plurality of vanes 64 to flow essentially aft-ward. The air 96 may enter combustion chamber 47 via injector ports 56 whereby the air 96 mixes with fuel injected from the one or more fuel injectors 53. The fuel-air mixture may be ignited in combustion chamber 47 and the exhaust gasses may exit the combustion chamber 47 via the turbine nozzle 44 whereby the flow of exhaust gasses is turned, or swirled, in a circumferential direction for expanding across turbine wheel 30. The exhaust gasses impart a rotational force on turbine wheel 30, thereby rotating compressor wheel 18, and enter the inner liner 48 whereby the gasses are exhausted from combustor 40 via exhaust duct 92. In this regard, the flow of the air through combustor 40, as illustrated by arrows 96, is directed in the aft direction (also referred to herein as a first longitudinal direction) through plenum 81, directed radially inward (also referred to herein as a first radial direction) through injector ports 56, directed in the forward direction (also referred to herein as a second longitudinal direction) through combustion chamber 47, directed radially inward from turbine nozzle 44 into inner liner 48, and directed in the aft direction through inner liner 48 to an exit thereof.

Furthermore, as illustrated by arrows 96, the flow of air may flow aft ward around the distal side of the combustor liner 46, around the aft end of the combustor liner radially inward, and in the forward direction along the proximal side of the combustor liner 46, and through one or more discrete standoff apertures 50 disposed circumferentially between combustor liner 46 and inner liner 48. Standoff apertures 50 may be sized to meter the flow of air, illustrated by arrows 96, into the combustion chamber 47. In this regard, each of the standoff apertures 50 may be disposed between a plurality of turbine nozzle standoffs 51 extending between, and integrated with, the combustor liner 46 and inner liner 48.

Figure 3A:
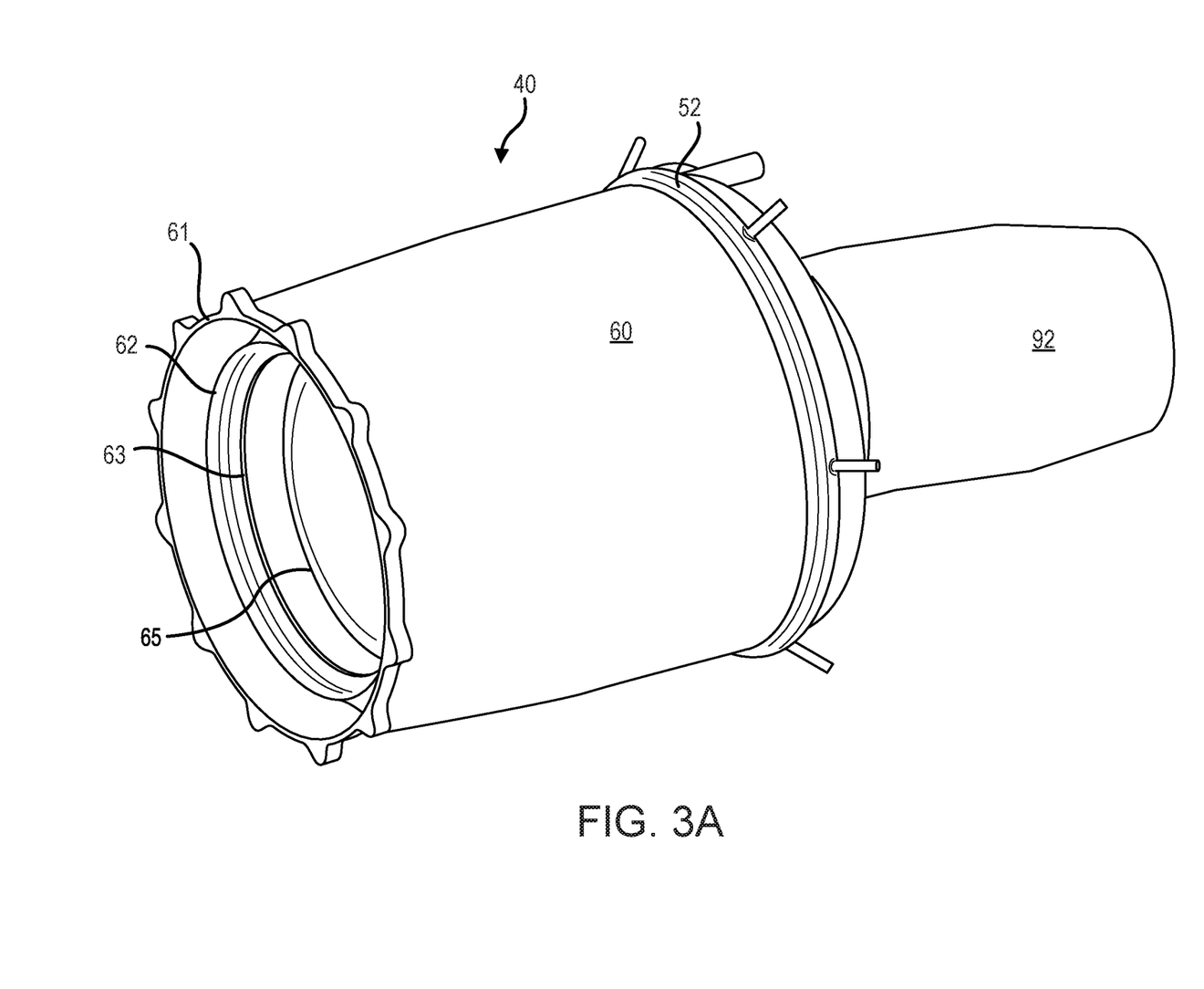
FIG. 3A illustrates a perspective view of a monolithic combustor, in accordance with various embodiments.
Figure 3B:
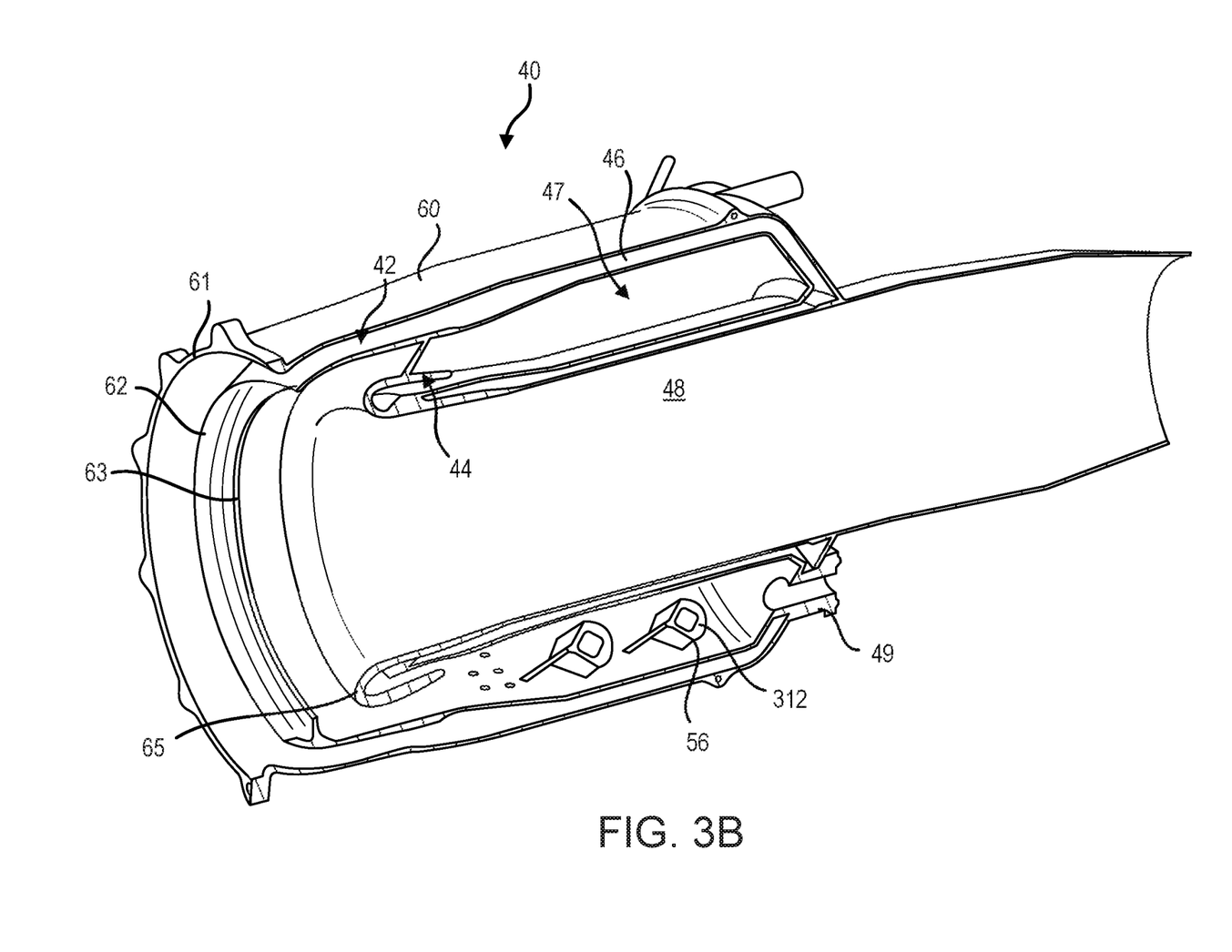
FIG. 3B illustrates a section, perspective view of the monolithic combustor of FIG. 3A, in accordance with various embodiments.
Figure 3C:
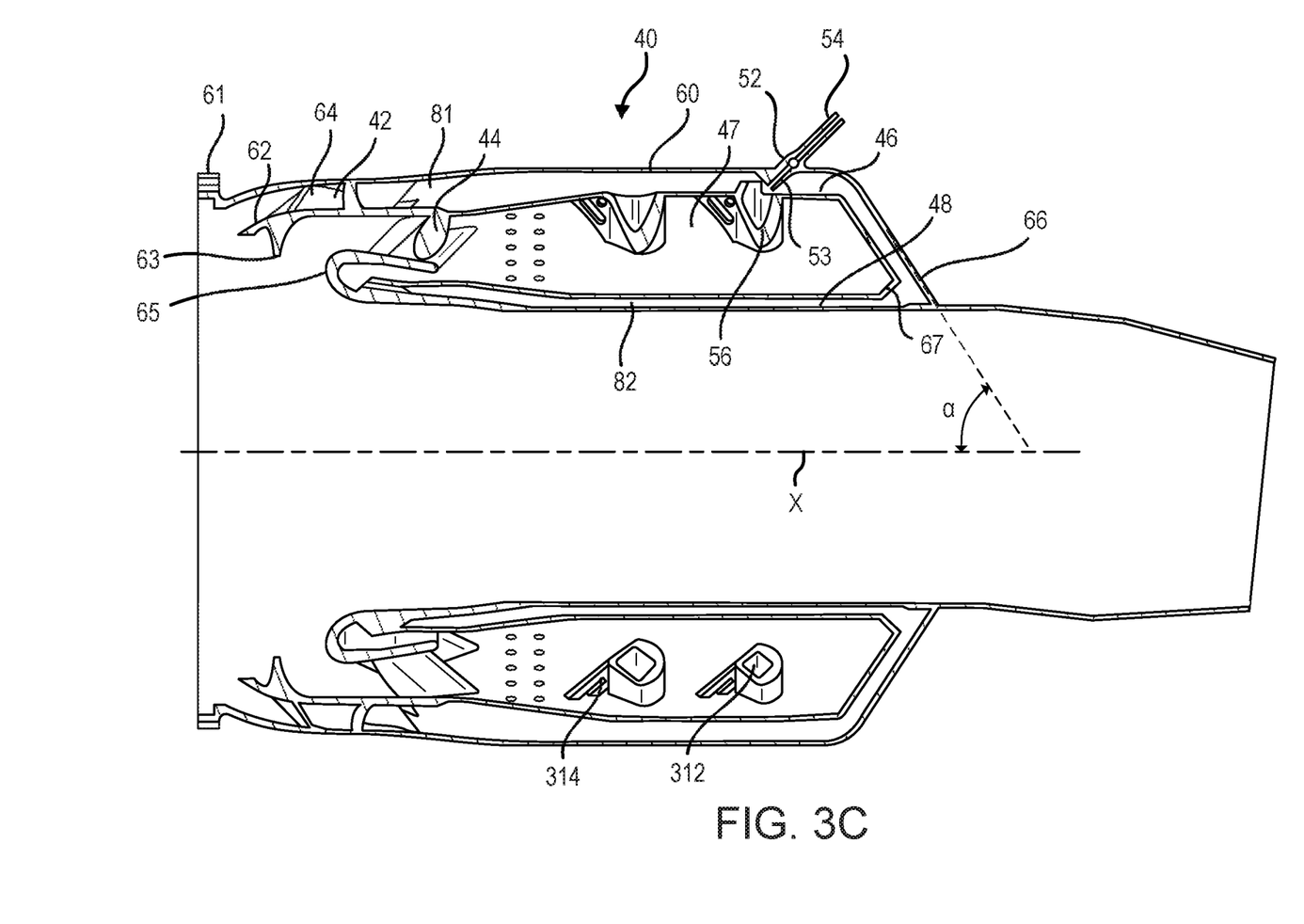
FIG. 3C illustrates a section, side view of the monolithic combustor of FIG. 3A, in accordance with various embodiments.

With combined reference to FIG. 3A, FIG. 3B, and FIG. 3C, combustor 40 may be made from a metallic material suitable to withstand high temperature gasses of the engine 10 (see FIG. 1). In various embodiments, combustor 40 may comprise one of a nickel alloy, a nickel steel (e.g., an austenitic nickel-chromium-based alloy such as that available under the trade name INCONEL), or any other material suitable to withstand high temperature gasses of combustor 40.

In various embodiments, combustor 40 is additively manufactured. As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure. In this regard, combustor 40 is a monolithic structure, in accordance with various embodiments.

In various embodiments, the injector ports 56 may define a diamond-shaped aperture 312. The geometry of the injector ports 56 may aid in the additive manufacturing process of combustor 40. In various embodiments, each injector port 56 may include a gusset 314 extending from a forward edge of the associated injector port 56 for aiding the additive manufacturing process of injector port 56. The direction that gusset 314 extends with respect to injector port 56 may depend on the direction that combustor 40 is built during the additive manufacturing process.

In various embodiments, an aft wall 66 of outer casing 60 may extend radially inward towards inner liner 48 at an angle α with respect to centerline axis X. In various embodiments, angle α is between twenty and ninety degrees (20°-89°). In various embodiments, angle α is between thirty and eighty degrees (30°-80°). In various embodiments, angle α is between thirty and seventy degrees (30°-70°). Aft wall 66 may comprise a truncated cone. The aft wall 66 may extend linearly between outer casing 60 and inner liner 48. The geometry of aft wall 66 may aid in the additive manufacturing process. In various embodiments, the aft, inner corner of combustor liner 46 may be chamfered to aid in turning the flow of air in the forward direction. In this regard, air may flow around combustor liner 46, in an aft direction between outer casing 60 and combustor liner 46, in a radially inward direction between combustor liner 46 and aft wall 66, and may turn at the chamfer 67 to flow forward between combustor liner 46 and inner liner 48. In this regard, an annular plenum 82 may be disposed between inner liner 48 and combustor liner 46.

Figure 4:
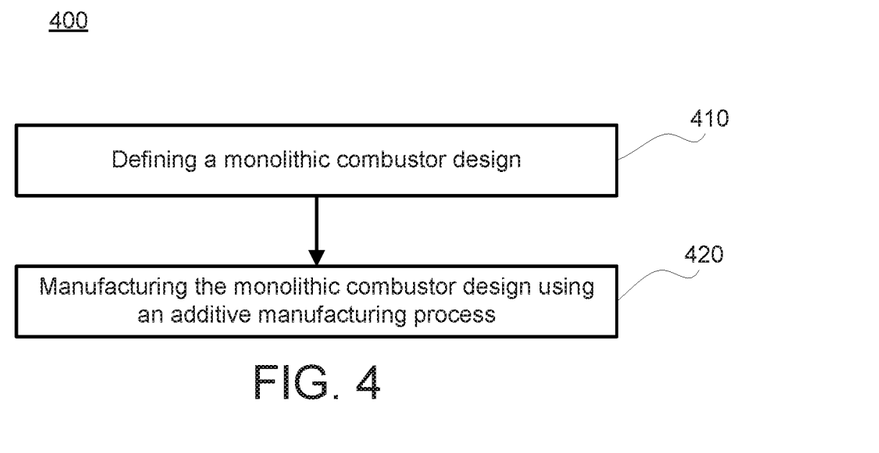
FIG. 4 illustrates a flow chart for a method for manufacturing a monolithic combustor, in accordance with various embodiments.

In various embodiments and with reference to FIG. 4, a method 400 for manufacturing a monolithic combustor using additive manufacturing can include defining a monolithic combustor design (step 410). For example, step 410 can comprise utilizing two-dimensional or three-dimensional modeling techniques to create a monolithic combustor design having at least one of: improved dynamic stability, tuned stiffness, reduced weight, improved aerodynamic performance, tuned thermal efficiency, improved manufacturability, and improved vibration damping. For example, the monolithic combustor design of step 410 can include geometric attributes such as forward flange 61, inner flange 62, gussets 314, geometric apertures 312, angled walls 66, among others.

In various embodiments, the monolithic combustor design of step 410 is then manufactured using an additive manufacturing process (step 420). For example, step 420 can comprise using a technique such as direct laser sintering to manufacture a monolithic combustor, such as combustor 40, having the same geometry and configuration as the monolithic combustor design of step 410.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A monolithic apparatus, comprising:
   an outer casing comprising a forward flange;
   a fuel manifold disposed on the outer casing and defining an annular chamber extending perimetrically around the outer casing;
   a combustor liner disposed within the outer casing, the combustor liner defining an annular combustion chamber;
   a first annular plenum disposed between the outer casing and the combustor liner, wherein the fuel manifold is disposed radially outward from the first annular plenum;
   an inner liner disposed radially from the combustor liner;

a first inner flange extending forward from the combustor liner;

a second inner flange extending radially inward from the first inner flange; and an aft wall of the outer casing at least partially defining a flow path for a flow of air around the combustor liner, wherein the aft wall extends from the inner liner at an angle with respect to a centerline axis of the monolithic apparatus.

2. The monolithic apparatus of claim 1, further comprising an injector port extending into the annular combustion chamber from the combustor liner.

3. The monolithic apparatus of claim 2, wherein the injector port defines a diamond-shaped aperture.

4. The monolithic apparatus of claim 2, further comprising a gusset extending from a forward edge of the injector port.

5. The monolithic apparatus of claim 1, wherein the angle is between thirty and eighty degrees.

6. The monolithic apparatus of claim 1, wherein an aft, radially inner corner of the combustor liner comprises a chamfer.

7. The monolithic apparatus of claim 1, further comprising a diffuser disposed at an inlet of the first annular plenum.

8. The monolithic apparatus of claim 1, further comprising a turbine nozzle disposed at an exit of the annular combustion chamber.

9. The monolithic apparatus of claim 1, further comprising a second annular plenum disposed between the inner liner and the annular combustion chamber.

10. A turbine engine arrangement, comprising:
a forward housing;
a rotor shaft rotatably mounted to the forward housing;
a compressor wheel operatively coupled to the rotor shaft;
a turbine wheel operatively coupled to the rotor shaft; and
a monolithic combustor, comprising:
an outer casing comprising a forward flange, wherein the forward housing is coupled to the monolithic combustor at the forward flange;
a fuel manifold disposed on the outer casing and defining an annular chamber extending perimetrically around the outer casing;
a combustor liner disposed within the outer casing, the combustor liner defining an annular combustion chamber;
a first annular plenum disposed between the outer casing and the combustor liner, wherein the fuel manifold is disposed radially outward from the first annular plenum;
an inner liner disposed radially from the combustor liner;
a first inner flange extending forward from the combustor liner; and
a second inner flange extending radially inward from the first inner flange; and
an aft wall of the outer casing at least partially defining a flow path for a flow of air around the combustor liner, wherein the aft wall extends from the inner liner at an angle with respect to a centerline axis of the monolithic combustor.

11. The turbine engine arrangement of claim 10, further comprising an injector port extending into the annular combustion chamber from the combustor liner.

12. The turbine engine arrangement of claim 10, further comprising a diffuser disposed at an inlet of the first annular plenum, wherein the diffuser receives a flow of air from the compressor wheel.

13. The turbine engine arrangement of claim 10, further comprising a turbine nozzle disposed at an exit of the annular combustion chamber, wherein the turbine nozzle directs a flow of combustion gas towards the turbine wheel.

14. The turbine engine arrangement of claim 12, wherein a geometry of the first inner flange is complementary to that of the compressor wheel.

15. The turbine engine arrangement of claim 13, wherein a geometry of the second inner flange is complementary to that of the turbine wheel.

16. The turbine engine arrangement of claim 10, further comprising a second annular plenum disposed between the inner liner and the annular combustion chamber.

17. The turbine engine arrangement of claim 10, wherein the turbine wheel extends at least partially into the inner liner.

18. The turbine engine arrangement of claim 10, wherein the monolithic combustor is configured to direct a flow of air in a first longitudinal direction through the first annular plenum, in a second longitudinal direction through the annular combustion chamber, and in the first longitudinal direction through the inner liner.

19. The monolithic apparatus of claim 2, further comprising a fuel injector aligned with the injector port and configured to direct a fuel from the fuel manifold to the injector port.

20. The turbine engine arrangement of claim 11, further comprising a fuel injector aligned with the injector port and configured to direct a fuel from the fuel manifold to the injector port.

* * * * *